US 8,045,454 B2

(12) United States Patent
 Litwack

(10) Patent No.: US 8,045,454 B2
(45) Date of Patent: Oct. 25, 2011

(54) MULTIMEDIA DATA FLOW DROPPING

(75) Inventor: Mark Litwack, West Chester, PA (US)

(73) Assignee: Cisco Technology, Inc., San Jose, CA (US)

( * ) Notice: Subject to any disclaimer, the term of this patent is extended or adjusted under 35 U.S.C. 154(b) by 981 days.

(21) Appl. No.: 11/225,302

(22) Filed: Sep. 12, 2005

(65) Prior Publication Data

US 2007/0076604 A1    Apr. 5, 2007

(51) Int. Cl.
 *H04L 12/56* (2006.01)
 *H04L 12/26* (2006.01)
(52) U.S. Cl. .................................. 370/229; 370/412
(58) Field of Classification Search ............ None
 See application file for complete search history.

(56) References Cited

U.S. PATENT DOCUMENTS

| | | | | |
|---|---|---|---|---|
| 5,828,653 | A * | 10/1998 | Goss | 370/412 |
| 6,052,376 | A * | 4/2000 | Wills | 370/412 |
| 6,134,239 | A * | 10/2000 | Heinanen et al. | 370/229 |
| 6,157,613 | A | 12/2000 | Watanabe et al. | |
| 6,188,671 | B1 | 2/2001 | Chase et al. | |
| 6,336,143 | B1 * | 1/2002 | Diedrich et al. | 709/231 |
| 6,363,069 | B1 * | 3/2002 | Levy et al. | 370/231 |
| 6,377,547 | B1 * | 4/2002 | Levy et al. | 370/231 |
| 6,424,620 | B1 | 7/2002 | Nishihara | |
| 6,851,008 | B2 | 2/2005 | Hao | |
| 6,870,812 | B1 * | 3/2005 | Kloth et al. | 370/235 |
| 6,922,396 | B1 * | 7/2005 | Knappe | 370/252 |
| 6,934,256 | B1 * | 8/2005 | Jacobson et al. | 370/235 |
| 6,981,054 | B1 * | 12/2005 | Krishna | 709/235 |
| 7,035,212 | B1 * | 4/2006 | Mittal et al. | 370/230 |
| 7,061,861 | B1 * | 6/2006 | Mekkittikul et al. | 370/230 |
| 7,106,691 | B1 * | 9/2006 | DeCaluwe et al. | 370/229 |
| 7,299,277 | B1 * | 11/2007 | Moran et al. | 370/230 |
| 7,376,085 | B2 * | 5/2008 | Yazaki et al. | 370/235 |
| 7,417,995 | B2 * | 8/2008 | Rabie et al. | 370/401 |
| 7,450,509 | B2 | 11/2008 | Hao | |
| 7,480,239 | B1 * | 1/2009 | Sundaresan et al. | 370/230 |
| 7,809,007 | B2 | 10/2010 | Mayhew et al. | |
| 2001/0048662 | A1 * | 12/2001 | Suzuki et al. | 370/230 |
| 2002/0003777 | A1 * | 1/2002 | Miyamoto | 370/389 |
| 2002/0054568 | A1 * | 5/2002 | Hoogenboom et al. | 370/235.1 |
| 2002/0097678 | A1 * | 7/2002 | Bisher et al. | 370/232 |
| 2002/0122387 | A1 * | 9/2002 | Ni | 370/231 |
| 2003/0002438 | A1 * | 1/2003 | Yazaki et al. | 370/229 |
| 2003/0123447 | A1 * | 7/2003 | Smith | 370/412 |
| 2004/0008697 | A1 * | 1/2004 | Millard et al. | 370/397 |
| 2004/0081080 | A1 * | 4/2004 | Ji et al. | 370/216 |

(Continued)

OTHER PUBLICATIONS

Office Action history of U.S. Appl. No. 11/292,757, dates ranging from Mar. 3, 2009-Feb. 9, 2011.

(Continued)

*Primary Examiner* — Chirag Shah
*Assistant Examiner* — Joshua Smith
(74) *Attorney, Agent, or Firm* — Patterson & Sheridan, LLP

(57) ABSTRACT

The present invention introduces a congestion control mechanism for constant bit rate (CBR) multimedia data flows in cable operator IP networks. A flow drop method within a congestion control unit of the present invention chooses a subset of multimedia data flows to drop, in whole, to alleviate a congestion condition. After the congestion condition is detected and the congestion control unit begins dropping multimedia data flows, the remaining multimedia data flows are no longer degraded for the end user, as compared to conventional congestion management systems.

15 Claims, 9 Drawing Sheets

U.S. PATENT DOCUMENTS

| | | |
|---|---|---|
| 2004/0085984 A1* | 5/2004 | Elzur .......................... 370/412 |
| 2004/0192333 A1 | 9/2004 | Khokhar |
| 2005/0192812 A1 | 9/2005 | Buchholz et al. |
| 2005/0276230 A1 | 12/2005 | Akahane et al. |
| 2006/0007859 A1 | 1/2006 | Kadambi et al. |
| 2006/0114820 A1* | 6/2006 | Hunt et al. .................... 370/229 |
| 2006/0159016 A1 | 7/2006 | Sagfors et al. |
| 2006/0184990 A1 | 8/2006 | Kwak et al. |
| 2006/0198308 A1 | 9/2006 | Vasseur et al. |
| 2006/0251000 A1 | 11/2006 | Williams |

OTHER PUBLICATIONS

Leon-Garcia, Alberto et al., User Datagram Protocol, 2004, pp. 601-602, McGraw-Hill, New York, New York, United States.

* cited by examiner

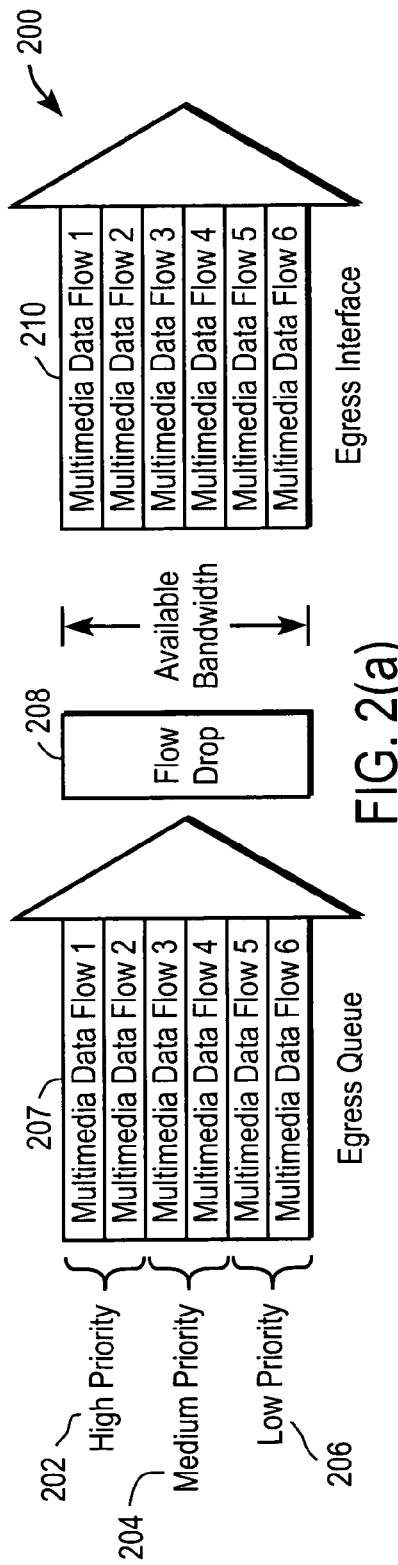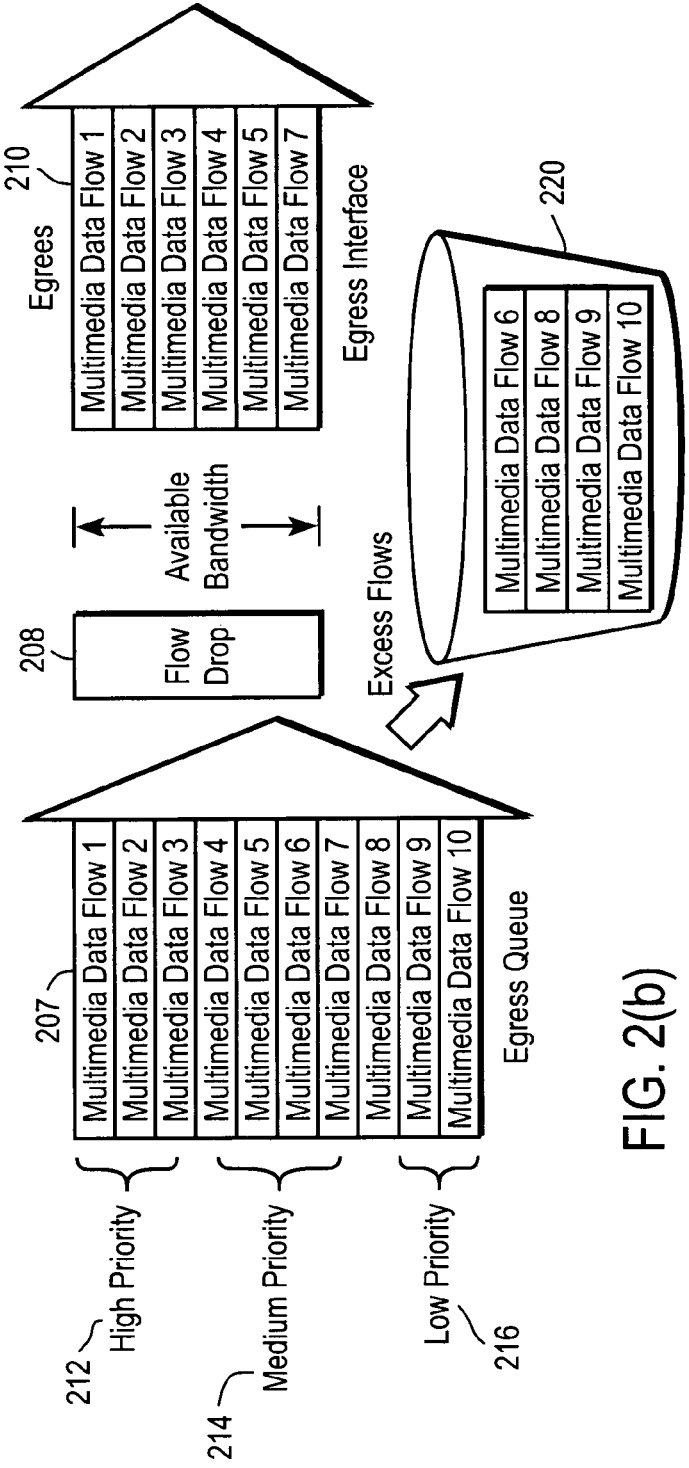
FIG. 2(a)
FIG. 2(b)

MULTIMEDIA DATA FLOW DROPPING

BACKGROUND OF THE INVENTION

1. Field of the Invention

The present invention relates generally to resource management and admission control of multimedia data flows and more specifically to management of multimedia data flows that are congested.

2. Description of Background Art

Multimedia data broadcast over an IP (Internet Protocol) infrastructure is a well-known way of transmitting and receiving multimedia data in today's information age. Unlike other forms of data (like text data), multimedia data is dependent upon an uninterrupted, constant flow of data packets (constant bit rate or CBR), to maintain the quality of the data received by an end user. The data packets in a multimedia data flow for standard cable TV viewing proceed through the IP network at a constant bit rate, such as 3.75M bits per second which corresponds to 356 IP packets/second. Multimedia data flow for CATV or HDTV systems is transmitted through the IP network to an end user's set top box (STB). The set top box is designed to receive the multimedia data flow and format the data properly for display on the user's television.

Difficulties arise during management of multimedia data over an IP network during times of congestion. CBR multimedia data over IP networks cannot use conventional congestion control techniques such as RED, WRED, etc. Applying these methods causes severe degradation to all multimedia data flows traversing the link. In conventional systems during periods of congestion, all degraded multimedia data flows are allowed to pass through the IP network and are received by the set-top box. Because the STB is receiving some information, albeit corrupted information, the STB is unable to detect and report a problem to the data sender. Conventional congestion control methods do not always preserve the integrity of any of the multimedia data flows during a period of network link congestion.

What is needed is an efficient means for monitoring and managing congestion of multimedia data flow traffic over an IP network.

BRIEF DESCRIPTION OF THE DRAWINGS

FIG. 2A is a block diagram of a congestion control unit operating during a period of un-congested flow, in accordance with an embodiment of the present invention.

FIG. 2B is a block diagram of a congestion control unit operating during a period of congested flow, in accordance with an embodiment of the present invention.

DETAILED DESCRIPTION OF PREFERRED EMBODIMENTS

A preferred embodiment of the present invention is now described with reference to the FIGs where like reference numbers indicate identical or functionally similar elements. Also in the FIGs, the leftmost digit(s) of each reference number correspond(s) to the FIG in which the reference number is first used.

An embodiment of the present invention introduces a congestion control mechanism for constant bit rate (CBR) multimedia data flows in IP networks. A flow drop method within a congestion control unit of the present invention chooses a subset of multimedia data flows to drop, in whole, to alleviate a congestion condition. Substantial benefits are provided by the claimed invention. After the congestion condition is detected and the congestion control unit begins dropping multimedia data flows, the remaining multimedia data flows are no longer degraded for the end user, as compared to conventional congestion management systems. Also, the complete drop of only a portion of the multimedia data flows allows those user devices associated with the dropped flows to detect the problem and take corrective or alternate action.

According to an embodiment, the present invention is invoked by a congestion condition being reached, or by a configurable bandwidth threshold. After detecting the congestion condition, the flow drop method randomly selects one or more of the multimedia data flows to be dropped. This randomly selected flow is completely dropped from the data transmission. If congestion continues, another flow, as determined by the congestion control unit, is dropped, and so on, until congestion subsides or the configurable bandwidth threshold is reached.

Figure 1:
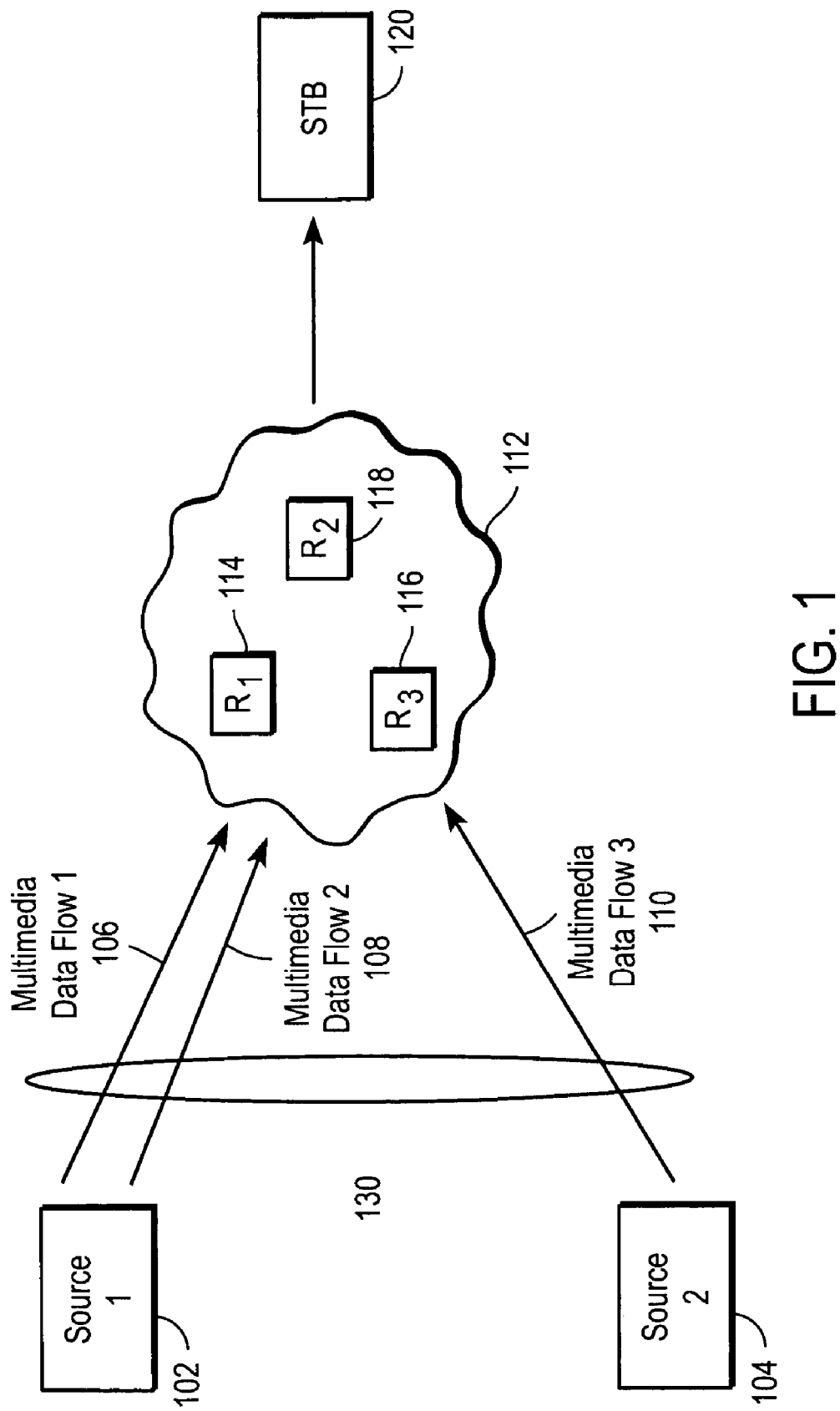
FIG. 1 is a block diagram of a multimedia data over IP network in accordance with an embodiment of the present invention.

FIG. 1 is a block diagram of multimedia data over an IP network in accordance with an embodiment of the present invention. The multimedia data over IP network of FIG. 1 contains a first multimedia data source 102 and a second multimedia data source 104 communicatively coupled, via a wired or wireless connection 130, to an IP network 112. The first multimedia data source 102 produces a first and a second multimedia data flow 106, 108 of constant bit rate multimedia data and the second multimedia data source 104 produces a third multimedia data flow 110 of constant bit rate video data. Each multimedia data flow is passed to the IP network 112 by way of the wired or wireless connection 130. The multimedia data flows 106, 108, 110 contain a sequence of multimedia data packets that represent one or more streams of multimedia data. An example of a multimedia data flow containing a single stream of data is video-on-demand, carried in MPEG Single Program Stream format. An example of a multimedia data flow containing multiple streams of data is network television programming (each stream represents a different television program), carried in MPEG Multiple Program Stream format. A skilled artisan will appreciate various embodiments similar to the one described in FIG. 1 where any particular number of multimedia data sources are available, each producing one or more flows of constant bit rate multimedia data into IP network 112.

Within the IP network 112 is a first router 114, a second router 118, and a third router 116. IP network 112 is communicatively coupled, via a wired or wireless connection 140, to an end user's set-top-box (STB) 120. First router 114, second router 118, and third router 116 determine the next network point to which a data packet within a particular multimedia data flow should be forwarded, enroute to its destination. First router 114, second router 118, and third router 116 also create or maintain a table of the available routes for a given multimedia data flow and use this information to determine a route for packets in the given multimedia data flow to proceed through the IP network 112. A skilled artisan will envision a multimedia data over IP network with any number of routers within the network arranged to determine routes for transmitting multimedia data flow from a variety of multimedia sources to one or more destinations (i.e., one or more STBS).

FIG. 2A is a block diagram of a congestion control unit 200 operating during a period of un-congested flow, in accordance with an embodiment of the present invention. The congestion control unit 200 diagramed in FIGS. 2A and 2B can be implemented on any number of the routers within the IP network 112 of FIG. 1. A flow drop method (or unit) 208, within the congestion control unit 200, is designed to monitor multimedia data flow between one or more ingress interfaces and an egress interface 210 of the particular router that is hosting the congestion control unit 200. The flow drop method operates on the construct of a logical egress queue 207 and a physical egress interface 210. The term "logical" is used because specific implementations may distribute queuing to multiple components within the device, including the physical ingress interfaces.

FIG. 2A shows six different 1.0 Gbps multimedia data flows passing between the egress queue 207 and the egress interface 210. The flow drop method 208 determines there is a total of 6.0 Gbps of available bandwidth between the egress queue 207 and the egress interface 210 of this particular router. In this example, the congestion control unit 200 is operating in an un-congested state because the total amount (6.0 Gbps) of multimedia data flow attempting to exit the egress interface 210 is less than or equal to the available bandwidth (6.0 Gbps). A congestion condition has not been reached therefore, the flow drop method 208 does not drop any multimedia data flows. In another embodiment, a skilled artisan will appreciate that a variety of different incoming multimedia data flows that occupy any particular amount of available bandwidth as required by a particular application.

The individual multimedia data flows, as shown in FIG. 2A, contain certain information that is used by the flow drop method 208 to determine at least one of the source, destination, or priority level of a particular flow of multimedia data attempting to pass through the egress interface 210. A more detailed discussion of the information used to define a particular multimedia data flow is addressed below.

As shown in FIG. 2A, incoming multimedia data flow can be categorized by the particular priority level of the multimedia data flow. In FIG. 2A, an incoming multimedia data flow is categorized as a high 202, medium 204, or low 206 priority. The priority level is defined, for example, by the source and destination information embedded within the header information of data packets within a particular multimedia flow, or it could be directly encoded in the IP ToS/DSCP (Type of Service or Differentiated Services Code Point) field. There may also be additional information in a multimedia data packet, such as RTP (Real-Time Protocol) header information, that routers may want to examine to determine priority information. In an embodiment, priority levels are critical broadcast data (high priority), paid for video-on-demand (medium priority), and free video-on-demand (low priority). A skilled artisan will appreciate that any variety of priority levels that can be assigned to the incoming multimedia data flows passing through egress interface 210. Other embodiments may use more or fewer priority levels depending on the particular constraints of the network.

In an embodiment, within a network router, a separate logical egress queue (or multiple queues) can be established to store multimedia data flows of a particular priority level to be sent out egress interface 210. The congestion control unit 200, operating on the logical egress queue 207, and the flow drop method 208 make decisions as to which queue is filled if there are multiple queues present within egress queue 207. These decisions are based on values in the multimedia data flow header, such as IP addresses, UDP port numbers, and DSCP/TOS values, using well-known routing techniques. The flow drop method 208 can be implemented in either hardware or software.

FIG. 2B is a block diagram of a congestion control unit 200 operating during a period of congested flow, in accordance with an embodiment of the present invention. FIG. 2B contains three 1.0 Gbps multimedia data flows assigned with a high priority 212, four 1.0 Gbps multimedia data flows assigned with a medium priority 214, and three 1.0 Gbps multimedia data flows assigned with a low priority 216. The total multimedia data flow into the logical egress queue 207 is 10.0 Gbps. In FIG. 2B, flow drop method 208 determines there is only 6.0 Gbps available bandwidth at the egress interface 210. In this embodiment, the congestion control unit 200 is operating in a congested state. A congestion condition has been reached because the total amount (10.0 Gbps) of multimedia data entering the egress queue 207 is greater than the available bandwidth (6.0 Gbps) of the egress interface 210. In another embodiment, a congestion condition is reached when the total amount of multimedia data entering the egress queue 207 is at 99% of the available bandwidth at the egress interface 210. In another embodiment, a congestion condition is determined when one or more egress queues are full. A skilled artisan will appreciate that a variety of methods can be used to determine a congestion condition. In general, any particular condition that is causing sustained packet loss can be considered a congestion condition. In an embodiment, a congestion condition can be determined when a particular flow of multimedia data is losing one multimedia data packet per second of data.

When a congestion condition has been reached, the flow drop method 208 is adapted to drop lower priority multimedia data flows. A more detailed discussion of dropping multimedia data flows occurs later on. Once an appropriate number of multimedia data flows have been dropped, the congestion condition is relieved and the flow of multimedia data flows from the logical egress queue 207 to the egress interface 210 returns to an un-congested state. Here, flow drop method 208 drops all of the low priority flows (8, 9, 10) and one randomly chosen medium priority flow (6). Dropped packets are logged or archived in memory 220. The flow dropping method of the present invention is adapted to drop all packets and streams associated with a particular flow that is marked as dropped. In certain embodiments, because an entire flow is being dropped, the source receives some form of notification that the flow has been dropped, thus discontinuing the transmission of that particular flow. The receiver of a dropped flow may also receive a notification that the flow has been dropped by the network. Certain accounting information, including UDP, IP, RTP source and destination addresses, can be used to identify a packet as a member of a particular flow when determining which flows to drop. The accounting information can also aid in the determination of the priority level of a particular multimedia data flow.

Figure 3A:
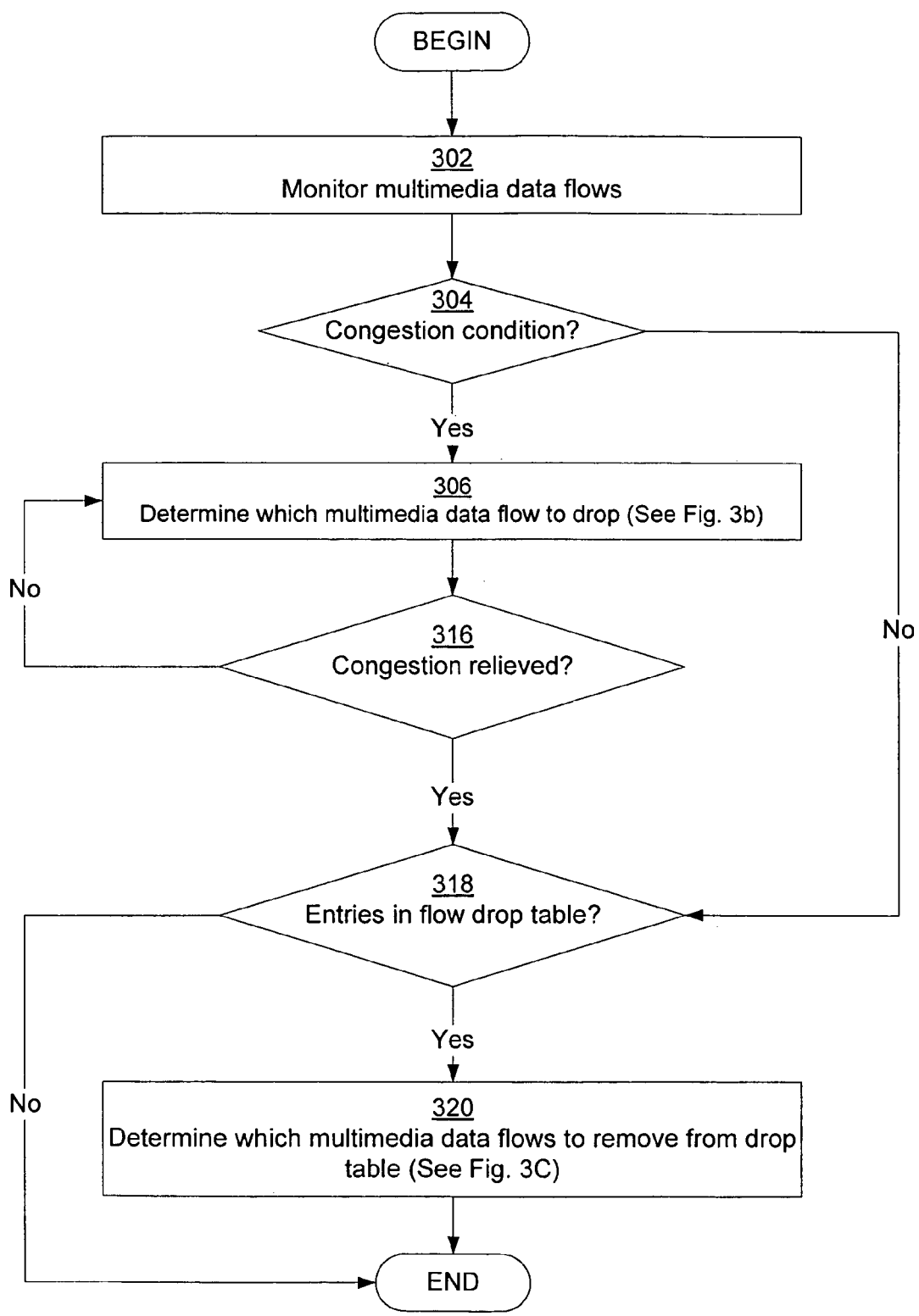
FIGS. 3A-3C are a series of flow diagrams describing a method for congestion control in a network in accordance with an embodiment of the present invention.
Figure 3B:
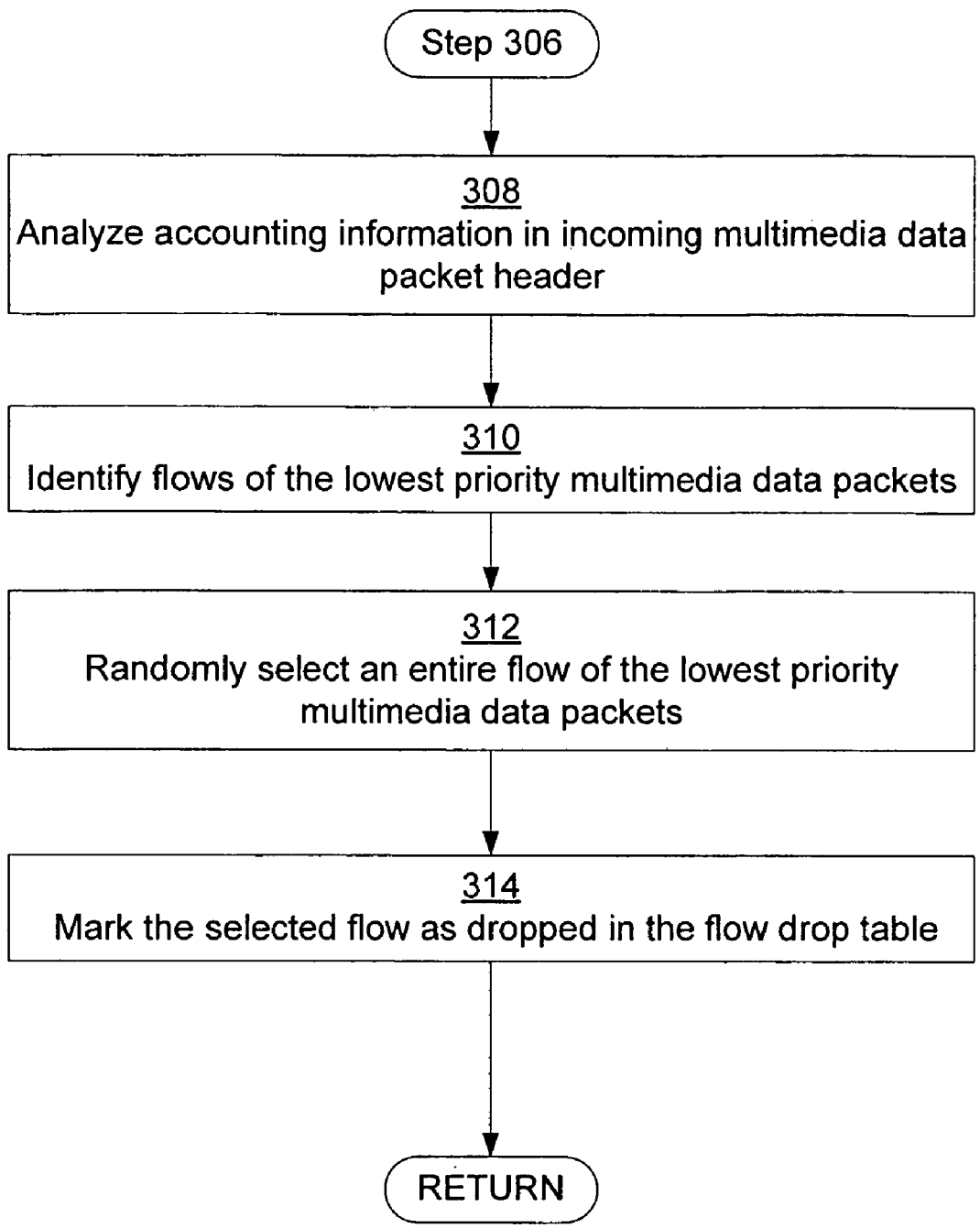
Figure 3C:
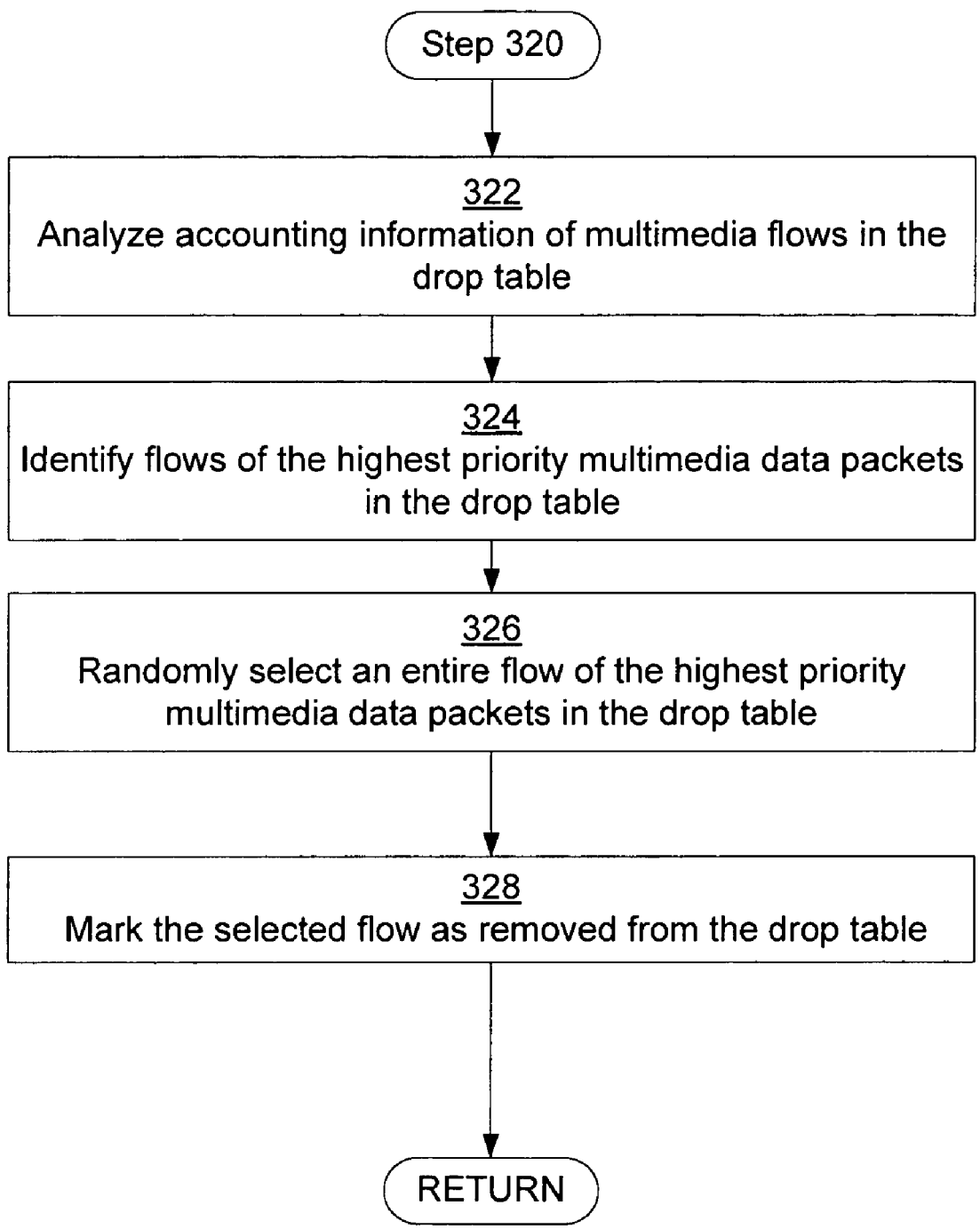

FIGS. 3A-3C are a series of flow diagrams describing a method for congestion control in a network in accordance with an embodiment of the present invention. In FIG. 3A, the congestion control unit 200 monitors 302 the flow of multimedia data flows into egress queue 207. In an embodiment, a network router, similar to the routers shown in FIG. 1, contains the egress interface 210 and congestion control unit 200. The frequency with which the congestion control unit 200 monitors the flow of multimedia data depends on the constraints of the particular network that is hosting the congestion control unit 200. The rate at which the flows are monitored can be based on available router resources, such as sufficient CPU power. In another embodiment, the invocation of the flow drop method 208 can be on-demand, triggered by the detection of a congestion condition. In an embodiment, monitoring the multimedia data flows can occur once every second, once every half-second, or once every minute. Other embodiments can support monitoring multimedia data flows more or less frequently.

Within the congestion control unit 200, the flow drop method 208 monitors 302 the multimedia data flows and determines 304 whether a congestion condition occurs. If no congestion occurs, the flow drop method 208 instructs the congestion control unit 200 to continue monitoring the flow of multimedia data flows until a congestion condition does occur. Once a congestion condition occurs, the flow drop method 208 determines 306 which flow or sets of flows are to be dropped in order to relieve 316 the congestion condition.

The determination of which flows are dropped by flow drop method 208 continues in FIG. 3B. The flow drop method 208 analyzes 308 the accounting information embedded within the header of an incoming multimedia data packet and identifies 310 flows of the lowest priority multimedia data packets. The flow drop method 208 then randomly selects 312, an entire flow of the lowest priority multimedia data packets and marks 314 the selected flow as dropped in a flow drop table. In another embodiment, the flow drop method 208 is capable of estimating how many lower priority multimedia data flows in a set of flows are needed to alleviate the congestion condition. The flow drop method 208 adds up the bandwidth for each lower priority flow and compares the sum with the available bandwidth to determine how many flows, in a set of flows, to drop from the network. In this embodiment, the method then drops the estimated set of multimedia data flows to alleviate the congestion condition. The dropped multimedia data flows (or information about them) are then logged or archived in memory unit 220, and the method returns the congestion control unit 200 to monitoring multimedia data flows. In an embodiment, accounting information about the non-dropped multimedia data flows is also recorded and used for later calculations.

The flow drop method 208 is adapted to continue dropping flows until the congestion condition is relieved. Once the congestion condition is relieved 316, the flow drop method 208 determines 318 whether any entries remain in the flow drop table. If the flow drop method 208 determines there are entries in the flow drop table, the flow drop method 208 is adapted to carry out the steps outlined in FIG. 3C for removing entries from the flow drop table. If the flow drop method determines in step 318 that no entries remain in the flow drop table, then the method is complete.

The determination of which flows are removed by flow drop method 208 from the flow drop table continues in FIG. 3C. The flow drop method 208 analyzes 322 the accounting information embedded within the header of any multimedia data flows listed in the flow drop table. The flow drop method 208 identifies 324 flows of the highest priority multimedia data packets in the drop table and randomly selects 326 an entire flow of the highest priority multimedia data packets. The flow drop method 208 marks 328 the selected flow as removed from the flow drop table and the selected flow is allowed to pass through the network. In another embodiment, the flow drop method 208 is capable of estimating how many higher priority multimedia data flows in a set of flows can be allowed to return to the network without re-introducing the congestion condition. The flow drop method adds up the bandwidth for each higher priority flows in the drop table and compares the sum with the available bandwidth to determine how many flows, in a set of flows, to release back into the network. In this embodiment, the flow drop method 208 removes the estimated set of multimedia data flows from the flow drop table without re-introducing the congestion condition. After the flow drop method 208 determines 320 which multimedia data flows to remove from the drop table, the method is complete.

Figure 4A:
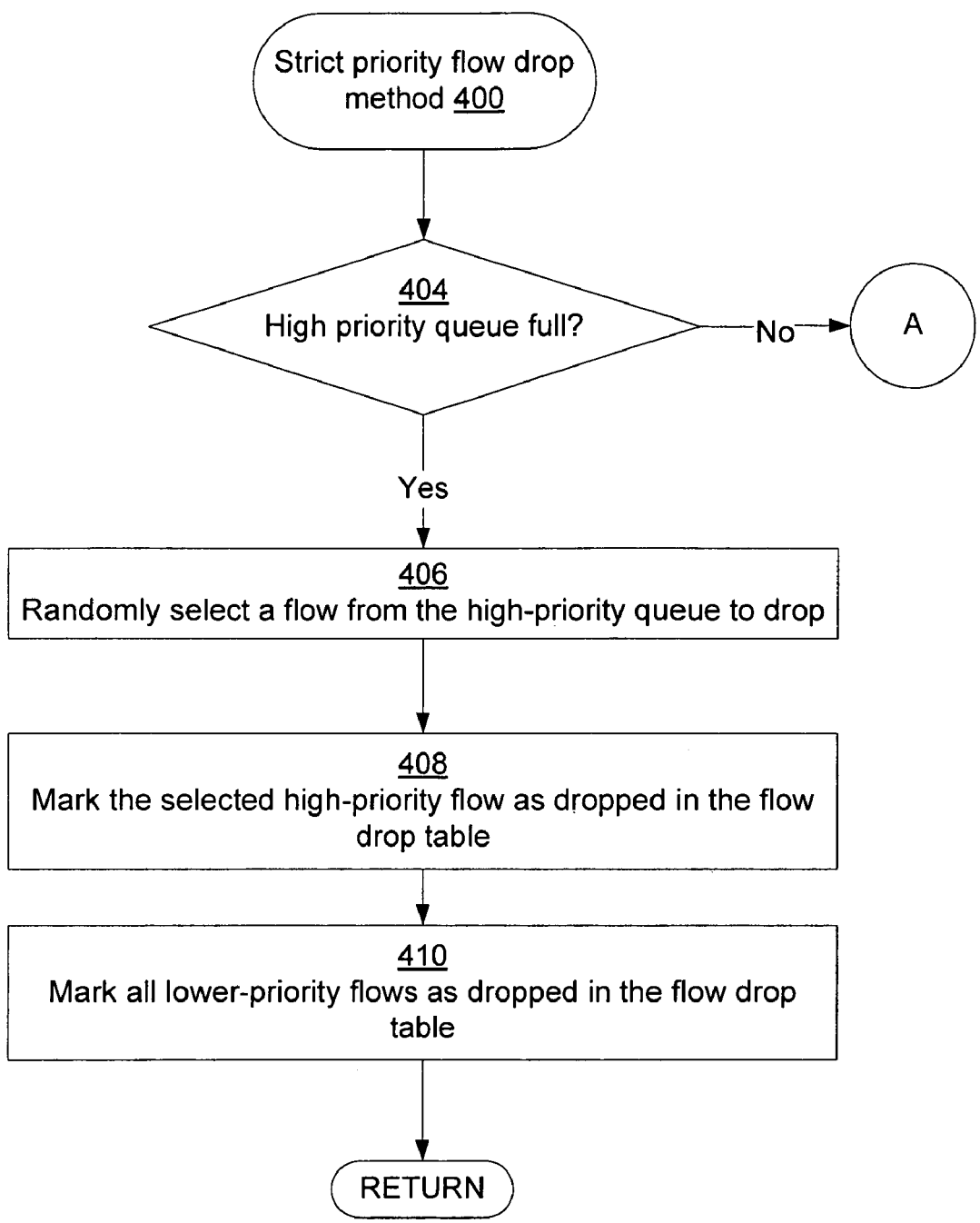
FIGS. 4A-4C are a series of flow diagrams describing a method for determining which multimedia data flows to drop in accordance with a strict priority dequeuing embodiment of the present invention.
Figure 4B:
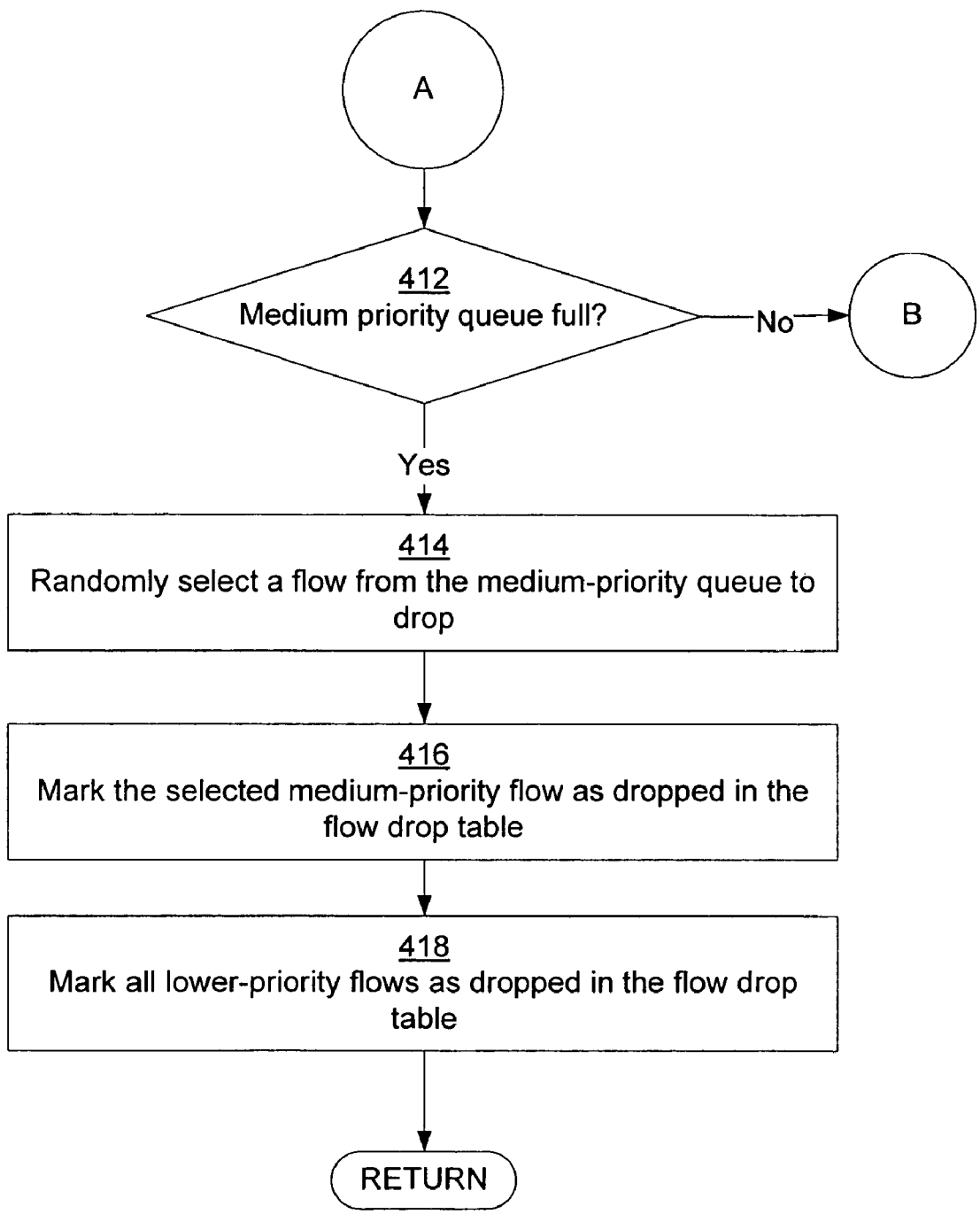
Figure 4C:
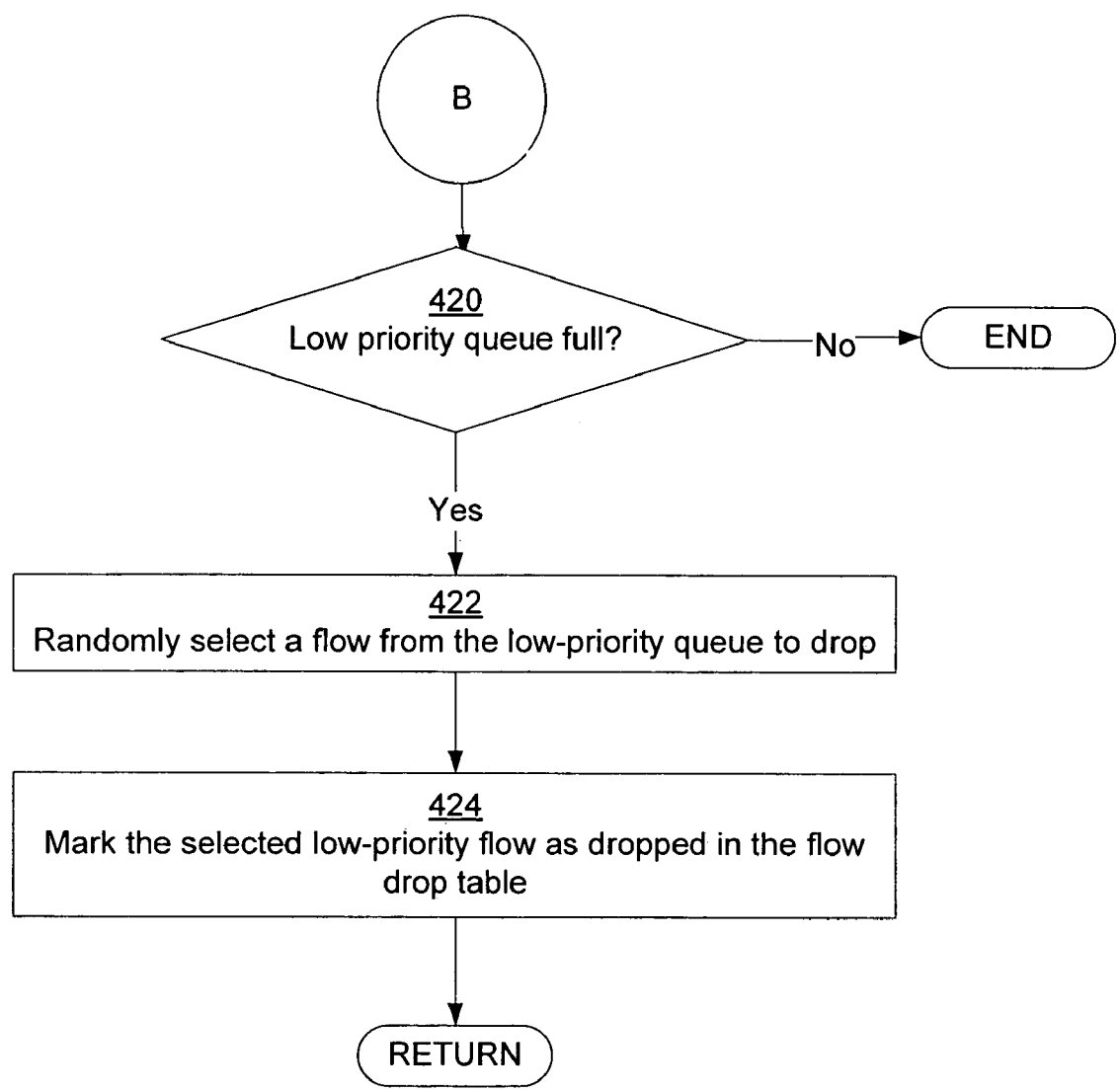

FIGS. 4A-4C are a series of flow diagrams describing a method 400 for determining which multimedia data flows to drop in accordance with a strict priority dequeuing embodiment of the present invention. The method described in FIGS. 4A-4C assumes that incoming multimedia data packets at an egress interface (like those shown in FIG. 1) are sorted through a strict priority queuing basis. During strict priority queuing, multimedia data packets arriving at the egress queue are sorted into one or more queues based on their priority. The priority can be ascertained by examining the TOS or DSCP header bits or other header information within the multimedia data packet. A dequeuing and transmitting algorithm dequeues the packets on a strict priority basis: If the highest priority queue has a packet to be sent it is sent immediately, if there is no packet in the highest priority queue, then the next highest priority queue is examined, and so on. If a packet is found in a queue it is sent and the dequeuing algorithm starts from the beginning at the highest priority queue. This method guarantees that all packets in a higher priority queue are sent before any other lower priority queue. Congestion starves the lower priority queues, and in severe congestion they are not able to send any packets at all.

The congestion control unit 200 is adapted to monitor multimedia data flows in a strict priority dequeuing embodiment. In this embodiment, when the flow drop method 208 detects a full egress queue in step 304 of FIG. 3A, the method 208 is adapted to begin dropping all packets in a multimedia data flow or all packets in multiple multimedia data flows to combat the congestion condition. A process 400 for determining which flow or sets of flows to drop from the flow is outlined in FIGS. 4A-4C for an IP network that supports multimedia data flows of at least three different priority levels, like those shown in FIG. 2B.

Initially, the flow drop method 208 determines 404 if the high priority queue is full. If the high priority queue is full, the flow drop method 208 randomly selects 406 a high-priority flow to drop and marks 408 the selected high-priority flow as dropped in the flow drop table. The flow drop method 208 then marks 410 all multimedia data flows in the lower priority queues as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many high-priority multimedia data flows, in a set of high-priority flows, to drop in order to alleviate the congestion condition. In this embodiment, the method then drops the estimated set of high-priority multimedia data flows, along with all multimedia data flows from the lower priority queues, to alleviate the congestion condition.

If the flow drop method 208 determines 404 that the high-priority queue is not full, the method moves to FIG. 4B where it determines 412 if the medium-priority queue within egress interface 210 is full. If the medium priority queue is full, the flow drop method 208 randomly selects 414 a medium-priority flow to drop and marks 416 the selected medium-priority flow as dropped in the flow drop table. The flow drop method 208 then marks 418 all multimedia data flows in lower priority queues as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many medium-priority multimedia data flows, in a set of medium-priority flows, to drop in order to alleviate the congestion condition. In this embodiment, the method then drops the estimated set of medium-priority multimedia data flows, along with all multimedia data flows from the lower priority queues, to alleviate the congestion condition.

If the flow drop method 208 determines 412 that the medium-priority queue is not full at the egress interface 210, the method moves to FIG. 4C where it determines 420 if the low priority queue is full. If the low priority queue is full, the flow drop method 208 randomly selects 422 a low-priority flow to drop and marks 424 the selected low-priority flow as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many low-priority multimedia data flows, in a set of low-priority flows, to drop in order to alleviate the congestion condition. In this embodiment, the method then drops the estimated set of low-priority multimedia data flows to alleviate the congestion condition. If the low priority queue is not full, then the flow drop method ends.

Figure 5:
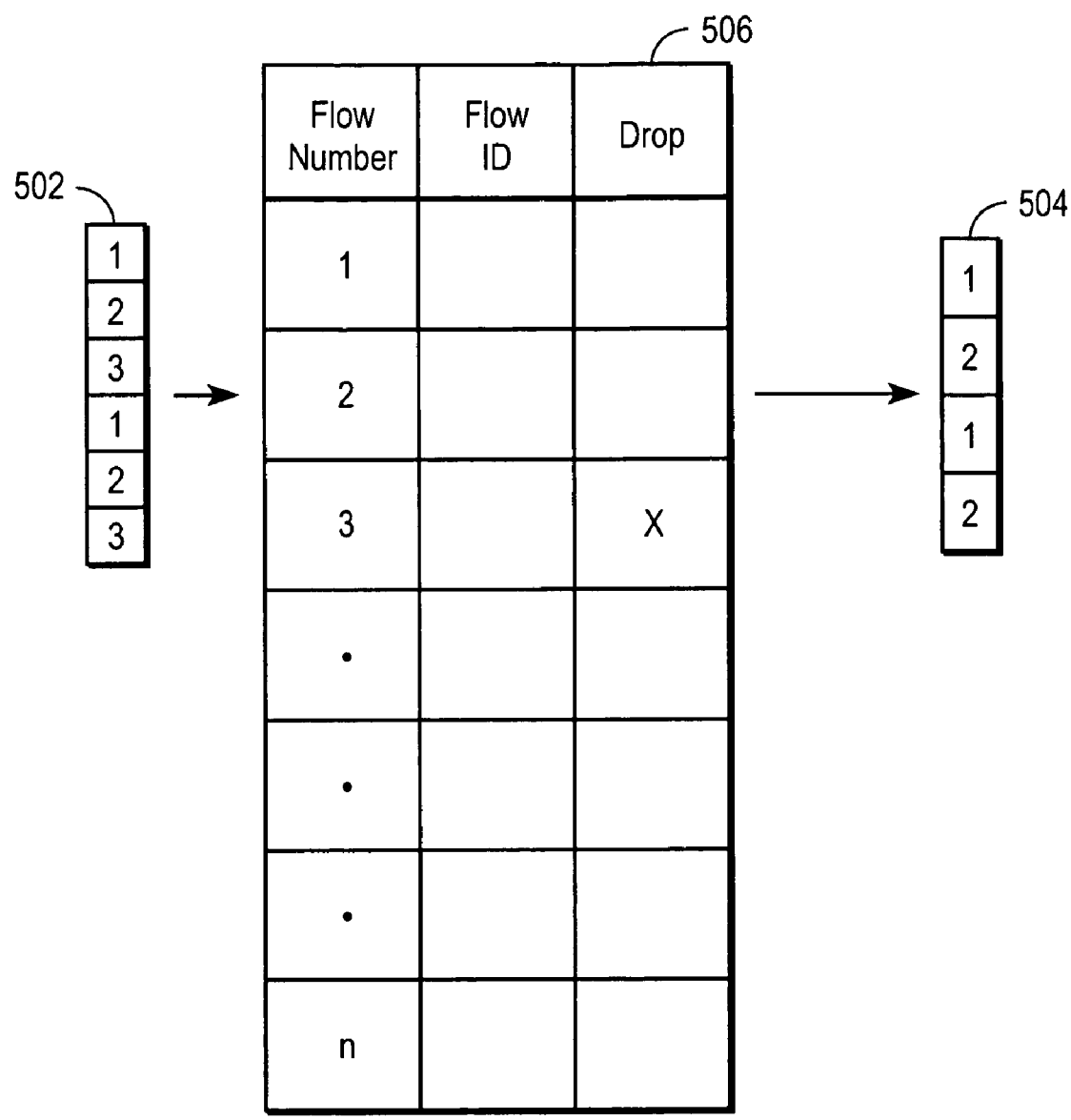
FIG. 5 is a block diagram of a multimedia data flow drop table in accordance with an embodiment of the present invention.

FIG. 5 is a block diagram of a multimedia data flow drop table 506 in accordance with an embodiment of the present invention. FIG. 5 contains an incoming flow of multimedia data 502 containing packets from three different incoming flows; a multimedia data flow drop table 506; and an outgoing flow of multimedia data 504 containing packets from two flows. Packets of flow 3 have been marked as dropped due to the presence of a congestion condition.

In this embodiment, flow drop table 506 contains at least two fields; a flow identification field and a flow drop field. Flow drop table 506 is capable of supporting one or more multimedia data flows, as determined by the network administrator. The flow identification field contains certain accounting information that allows the congestion control unit 200 the ability to uniquely identify the source, destination, and priority of a particular multimedia data flow. This information uniquely identifies multimedia data packets belonging to the multimedia flow. The flow identification field can be defined by source IP, source UDP, source RTP, destination IP, destination UDP, and destination RTP. In another embodiment, the flow identification field can be defined by the destination IP and the destination UDP. The flow identification field can also contain a numerical designation representing a particular multimedia data flow passing through the IP network. The flow drop field contains a symbolic designation representing that a particular flow has been marked to be dropped. One skilled in the art will appreciate other embodiments of flow drop table 506 that contain only the flow identification field and the flow drop field.

FIG. 5 represents a graphical display of packets of a particular multimedia data flow (number 3) being selected from an incoming flow 502 of multimedia data flow data and marked for dropping in the flow drop table 506. The outgoing flow 504 of multimedia data does not contain packets from multimedia data flow number 3 as it has been dropped completely. By completely dropping all packets of multimedia data flow number 3, multimedia data flow numbers 1 and 2 are able to pass through an IP network, uncorrupted, shortly after a congestion condition has been detected.

As will be understood by those familiar with the art, the invention may be embodied in other specific forms without departing from the spirit or essential characteristics thereof.

Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE 1394, Universal Serial Bus, or wireless networks such as IEEE 802.11 or IEEE 802.15 networks, in any combination. Variations upon and modifications to the preferred embodiments are provided for by the present invention, which is limited only by the following claims.

What is claimed is:

1. A method for relieving congestion in a plurality of multimedia data flows through a network, each multimedia flow containing a plurality of multimedia data packets, the method comprising:
   receiving multimedia data packets in the plurality of multimedia data flows at an egress interface, wherein each multimedia data packet is sorted into a prioritized queue selected from a plurality of prioritized queues based on priority information embedded within a packet header in the multimedia data packet, wherein the priority information embedded within the packet header describes a flow priority level of the multimedia data flow to which the packet belongs, and wherein each of the prioritized queues in the plurality of prioritized queues is associated with a respective priority level;
   determining that a congestion condition has been reached at the egress interface, when one of the plurality of prioritized queues containing at least two multimedia data flows is full;
   responsive to determining that the congestion condition has been reached, selecting at random one of the plurality of multimedia data flows having packets in the prioritized queue that is full;
   responsive to the selection:
     dropping all multimedia data packets subsequently received at the egress interface in the selected multimedia data flow;
     dropping all multimedia data packets subsequently received at the egress interface in any prioritized queues in the plurality of prioritized queues having a priority level that is lower than the priority level of the prioritized queue that is full.

2. The method of claim 1 where determining a congestion condition occurs in response to determining an available bandwidth at the egress interface is exceeded.

3. The method of claim 1, further comprising:
   for at least one of the multimedia data flows in which the multimedia data packets are dropped, transmitting a notification to a source network device for the multimedia data flow, wherein the notification indicates that the multimedia data flow has been dropped at the network egress interface, and wherein the multimedia data packets in a respective one of the at least one multimedia data flows were created by the source network device.

4. The method of claim 1, further comprising:
for at least one of the multimedia data flows in which the multimedia data packets are dropped, transmitting a notification to a destination network device for the multimedia data flow, wherein the notification indicates that the multimedia data flow has been dropped at the network egress interface, and wherein the multimedia data packets in a respective one of the at least one multimedia data flows were created by the source network device.

5. A method for relieving congestion in a plurality of multimedia data flows through a network, each multimedia flow containing a plurality of multimedia data packets, the method comprising:
receiving multimedia data packets in the plurality of multimedia data flows at an egress interface, wherein each multimedia data packet is sorted into a prioritized queue selected from a plurality of prioritized queues based on priority information embedded within a packet header in the multimedia data packet, wherein the priority information embedded within the packet header describes a flow priority level of the multimedia data flow to which the packet belongs, and wherein each of the prioritized queues in the plurality of prioritized queues is associated with a respective priority level;
determining that a congestion condition has been reached at the egress interface, when one of the plurality of prioritized queues containing at least two multimedia data flows is full;
responsive to determining that the congestion condition has been reached, selecting at random one of the plurality of multimedia data flows having packets in the prioritized queue that is full;
dropping all multimedia data packets subsequently received at the egress interface in the selected multimedia data flow;
dropping all multimedia data packets subsequently received at the egress interface in any prioritized queues in the plurality of prioritized queues having a priority level that is lower than the priority level of the prioritized queue that is full; and
responsive to a relieved congestion condition, resuming the removed multimedia data flow.

6. The method of claim 5, wherein the flow drop table comprises a flow identification field and a flow drop field.

7. The method of claim 1, where the plurality of prioritized queues includes at least a high-priority queue, a medium-priority queue, and a low-priority queue.

8. The method of claim 7 where determining a congestion condition occurs when at least one of the high-priority queue, medium-priority queue, and low-priority queue is full.

9. The method of claim 5, wherein:
the selected multimedia data flow is a high priority data flow;
dropping multimedia data packets comprises marking the selected high-priority multimedia data flow as dropped in the flow drop table and marking all multimedia data flows from lower priority queues as dropped in the flow drop table; and
resuming the removed multimedia data flow comprises allowing the removed multimedia data flow to traverse the egress interface unimpeded.

10. The method of claim 5 wherein the relieved congestion condition occurs in response to determining that available bandwidth has reached a predetermined level.

11. The method of claim 9 wherein the relieved congestion condition occurs in response to determining one of the queues is no longer full.

12. The method of claim 1 where selecting, in response to the congestion condition, comprises:
analyzing accounting information of incoming multimedia data packet headers;
identifying a flow of incoming multimedia data with the lowest priority level; and
selecting the entire low priority flow.

13. An apparatus for relieving congestion in a plurality of multimedia data flows through a network, each multimedia flow containing a plurality of multimedia data packets, the apparatus comprising:
an egress interface for receiving multimedia data packets in the plurality of multimedia data flows, and for sorting each multimedia data packet into at least a high-priority queue, a medium-priority queue, and a low-priority queue based on priority information embedded within a packet header in the multimedia data packet, wherein the priority information embedded within the packet header describes a flow priority level of the multimedia data flow to which the packet belongs, and wherein each of the prioritized queues in the plurality of prioritized queues is associated with a respective priority level;
a congestion control unit, coupled to the egress interface, for determining that a congestion condition has been reached at the egress interface when one of the high-priority, medium-priority, or low-priority queues containing at least two multimedia data flows is full;
a selecting unit coupled to the congestion control unit for selecting at random, in response to the congestion condition, one of the plurality of multimedia data flows having packets in the priority queue that is full; and
a flow drop unit, coupled to the selecting unit, for dropping the multimedia data packets in the selected multimedia data flow, subsequently received at the egress interface, and wherein the flow drop unit is further configured to drop multimedia data packets subsequently received at the egress interface in any prioritized queues in the plurality of prioritized queues having a priority level that is lower than the priority level of the prioritized queue that is full.

14. The apparatus of claim 13 wherein the selecting unit, in response to the congestion condition being reached at the egress interface, further performs the following steps:
analyzing accounting information of incoming multimedia data packet headers;
identifying a flow of incoming multimedia data with the lowest priority level; and
selecting the entire low priority flow.

15. An apparatus for relieving congestion in a plurality of multimedia data flows through a network, each multimedia flow containing a plurality of multimedia data packets, the apparatus comprising:
an egress interface for receiving multimedia data packets in the plurality of multimedia data flows, and for sorting each multimedia data packet into a prioritized queue selected from a plurality of prioritized queues based on priority information embedded within a packet header in the multimedia data packet, wherein the priority information embedded within the packet header describes a flow priority level of the multimedia data flow to which the packet belongs, and wherein each of the prioritized queues in the plurality of prioritized queues is associated with a respective priority level;

a congestion control unit, coupled to the egress interface, for determining that a congestion condition has been reached at the egress interface, when one of the plurality of prioritized queues containing at least two multimedia data flows is full;

a selecting unit coupled to the congestion control unit for selecting at random, in response to the congestion condition, one of the plurality of multimedia data flows having packets in the prioritized queue that is full; and a flow drop unit, coupled to the selecting unit, for dropping the multimedia data packets in the selected multimedia data flow, subsequently received at the egress interface;

wherein the selecting unit, in response to the congestion condition being reached at the egress interface, further performs the following steps: analyzing accounting information of incoming multimedia data packet headers, identifying a flow of incoming multimedia data with the lowest priority level, and selecting the entire low priority flow; and wherein the flow drop unit is further configured to, in response to a relieved congestion condition, resume the removed multimedia data flow.

* * * * *